United States Patent
Komeno et al.

(10) Patent No.: US 9,488,202 B2
(45) Date of Patent: Nov. 8, 2016

(54) CLIP

(75) Inventors: Jun Komeno, Okazaki (JP); Takahiro Sugiyama, Anjo (JP); Toshio Iwahara, Okazaki (JP)

(73) Assignee: DAIWA KASEI KOGYO KABUSHIKI KAISHA, Aichi-Ken (JP)

( * ) Notice: Subject to any disclaimer, the term of this patent is extended or adjusted under 35 U.S.C. 154(b) by 270 days.

(21) Appl. No.: 14/123,042

(22) PCT Filed: Aug. 8, 2012

(86) PCT No.: PCT/JP2012/070216
§ 371 (c)(1),
(2), (4) Date: Oct. 1, 2014

(87) PCT Pub. No.: WO2013/027582
PCT Pub. Date: Feb. 28, 2013

(65) Prior Publication Data
US 2015/0026933 A1    Jan. 29, 2015

(30) Foreign Application Priority Data

Aug. 24, 2011  (JP) .................................. 2011-182530

(51) Int. Cl.
  F16B 5/06   (2006.01)
  B60R 13/02  (2006.01)
  F16B 21/07  (2006.01)

(52) U.S. Cl.
CPC ......... F16B 5/0621 (2013.01); B60R 13/0206 (2013.01); F16B 21/075 (2013.01); F16B 5/065 (2013.01); F16B 5/0657 (2013.01); Y10T 24/44017 (2015.01)

(58) Field of Classification Search
CPC ........... Y10T 24/44017; Y10T 24/309; F16B 21/075; F16B 5/06; F16B 17/00
See application file for complete search history.

(56) References Cited

U.S. PATENT DOCUMENTS

| 6,449,814 B1 * | 9/2002 | Dinsmore | F16B 5/065 24/289 |
| D671,391 S * | 11/2012 | Komeno | D8/356 |
| D685,626 S * | 7/2013 | Komeno | D8/356 |
| D691,026 S * | 10/2013 | Komeno | D8/356 |
| 8,567,017 B2 | 10/2013 | Iwahara et al. | |
| D708,044 S * | 7/2014 | Komeno | D8/356 |
| D709,354 S * | 7/2014 | Komeno | D8/356 |
| 2011/0203081 A1* | 8/2011 | Iwahara | F16B 5/065 24/458 |
| 2013/0199003 A1* | 8/2013 | Iwahara | F16B 2/22 24/530 |
| 2014/0000071 A1* | 1/2014 | Choi | F16B 21/075 24/543 |
| 2014/0363224 A1* | 12/2014 | Iwahara | B60R 13/0206 403/326 |
| 2015/0026933 A1* | 1/2015 | Komeno | B60R 13/0206 24/457 |

FOREIGN PATENT DOCUMENTS

| CN | 102084139 A | 6/2011 |
| GB | 2 334 298 | 8/1999 |
| JP | 04-041104 U | 4/1992 |
| JP | 2995329 B1 | 12/1999 |
| JP | 2000-205214 A | 7/2000 |
| JP | 2001-289217 A | 10/2001 |
| JP | 2006-300143 | 11/2006 |
| WO | WO 2007/126201 | 11/2007 |

\* cited by examiner

*Primary Examiner* — Robert J Sandy
*Assistant Examiner* — Michael Lee
(74) *Attorney, Agent, or Firm* — Christensen Fonder P.A.

(57) ABSTRACT

A clip having a main clip body that is made of resin and has a shape in front view that is closed at one end and open at the other end. The main clip body has engaging arms and holding members positioned to the inside of the engaging arms. The engaging arms are configured so as to be elastically deformed when the main clip body passes through an installing hole of a partner panel and to engage with a rim of the hole when the engaging arms have been inserted. The holding members are configured so as to keep the main clip body fitted onto the clip seat of the mounted member. The engaging arms and the holding members are connected to assume a substantially diamond-shaped loop in front view, and are configured so that the positions thereof differ in side view, and overlap in front view, when elastically deformed.

2 Claims, 9 Drawing Sheets

CLIP

PRIORITY CLAIM

The present application is a National Phase entry of PCT Application No. PCT/JP2012/070216, filed Aug. 8, 2012, which claims priority from Japanese Patent Application No. 2011-182530, filed Aug. 24, 2011, the disclosures of which are hereby incorporated by reference herein in their entirety.

BACKGROUND OF THE INVENTION

1. Field of the Invention

Embodiments of the present invention relate to a clip for fixing an attachment member to a panel. The attachment member is a center cluster, or the like, which is an interior part of an automobile. The panel is an instrument panel, or the like of an automobile.

2. Description of the Related Art

The Japanese Patent Publication No. 2995329 and Japanese Patent Publication No. 15 4375877 disclose clips. Each clip includes a pair of engagement arms and a pair of holding members. The pair of engagement arms are connected to each other so as to substantially form a U-shape. The pair of holding members face each other between the engagement arms. Both ends of each holding member are connected to an inner edge of each engagement arm. The clip is attached to a clip seat of the attachment member using both of the holding members. In this state, the clip is inserted into a fixing hole on the corresponding panel, then both of the engagement arms are engaged with the edge of the fixing hole, and thereby the clip is fixed to the corresponding panel.

Each engagement arm is connected to each holding member in a loop shape, and is configured to be in a layer structure. In the layer structure, the engagement arms and the holding members are arranged in parallel in an inner and outer direction. For this reason, when the clip is inserted into the fixing hole of the corresponding panel, the holding members restrict the approach of the pair of engagement arms, and thus, the width of the clip is restricted such that it is narrow. Thus, the opening dimension of the fixing hole of the corresponding panel becomes large. In addition, since the clip has a layer structure, repelling force of the engagement arms generated when they are inserted into the fixing hole becomes strong. Thus, an insertion load on the clip increases.

In order to reduce the opening dimension of the fixing hole, reducing the thicknesses of the engagement arms or the holding members is considered contemplated. In such a case, however, elastic force of the engagement arms or the holding members is reduced. Accordingly, engagement force, or the like, of the clip exerted on the attachment member becomes unsatisfactory. Therefore, there is a need in the art for a compact clip in which an insertion load is small when the clip is inserted into a hole and in which an engagement force of the clip exerted on the attachment member is sufficiently strong.

SUMMARY OF THE INVENTION

According to one aspect of the present invention, a clip attaches an attachment member to a corresponding panel by being inserted into a fixing hole of the corresponding panel in a state that the clip is attached to a clip seat of the attachment member. The clip preferably has a clip main body made of a resin. The clip main body preferably has one closed end portion and an open end portion as seen from a front view. The clip main body preferably has an engagement arm and a holding member positioned on an inner side of the engagement arm. The engagement arm is preferably pressed when the clip main body penetrates through the fixing hole of the corresponding panel so as to be elastically deformed. The engagement arm is preferably configured to engage with the edge of the fixing hole when the engagement arm is inserted into the fixing hole. The holding member is preferably configured to hold a state in which the clip main body is attached to the clip seat of the attachment member. The engagement arm and the holding member are preferably connected to each other substantially in a rhombic-loop shape as seen from the front view. The engagement arm and the holding member are preferably disposed in different positions as seen from a side view, and are preferably configured to overlap each other as seen from the front view during elastic deformation thereof.

Thus, when the clip main body penetrates through the fixing hole of the corresponding panel, the engagement arm and the holding member may overlap each other as seen from the front view. Accordingly, the width of the clip main body as seen from the front view typically becomes narrow. Accordingly, the opening dimension of the fixing hole can be reduced without thinning the engagement arm or the holding member. The engagement arm bends while overlapping the holding member as seen from the front view. Thereby, when the clip main body is inserted into the fixing hole, the engagement arm is elastically deformed while being hardly destructed by the holding member. Accordingly, an insertion load becomes relatively low.

Since the engagement arm and the holding member are connected to each other substantially in a rhombic-loop shape, elastic force necessary for the engagement arm can be secured. Thus, force generated when the engagement arm is elastically deformed is transmitted directly to the holding member. Accordingly, the holding member can engage intensely with the clip seat. Thus, when the attachment member is detached from the corresponding panel, the clip main body can be taken out from the fixing hole of the corresponding panel in the state where the clip main body is securely attached to the clip seat.

DETAILED DESCRIPTION OF THE INVENTION

Figure 1:
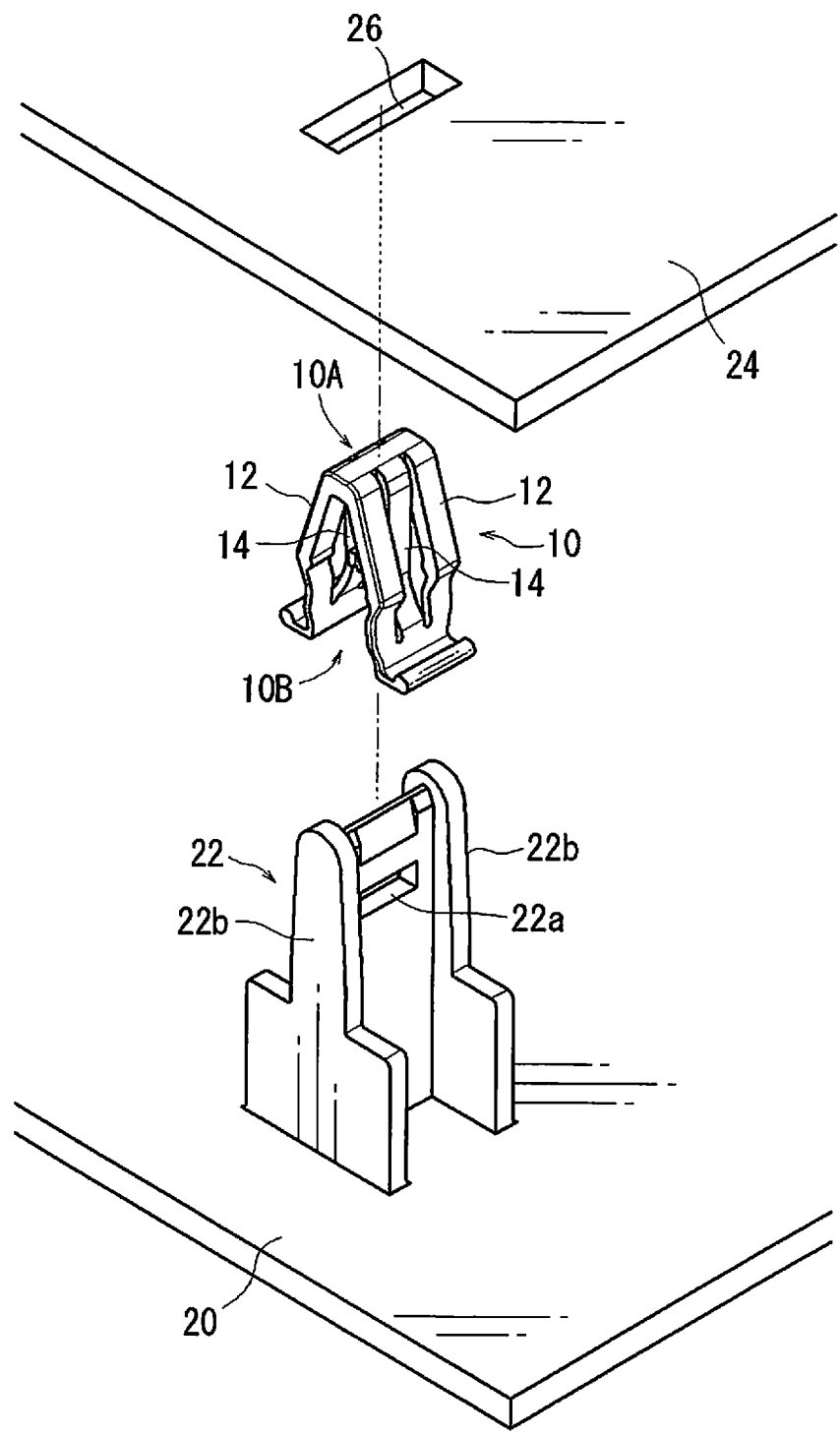
FIG. 1 is a perspective view of a clip, an attachment member and a corresponding panel.

An embodiment of the present invention will be described with reference to drawings. A clip main body 10 can be attached to a clip seat 22 of an attachment member 20 shown in FIG. 1. In this state, the clip main body 10 is inserted into a fixing hole 26 of a corresponding panel 24, and accordingly the clip main body 10 can fix the attachment member 20 to the corresponding panel 24.

Figure 4:
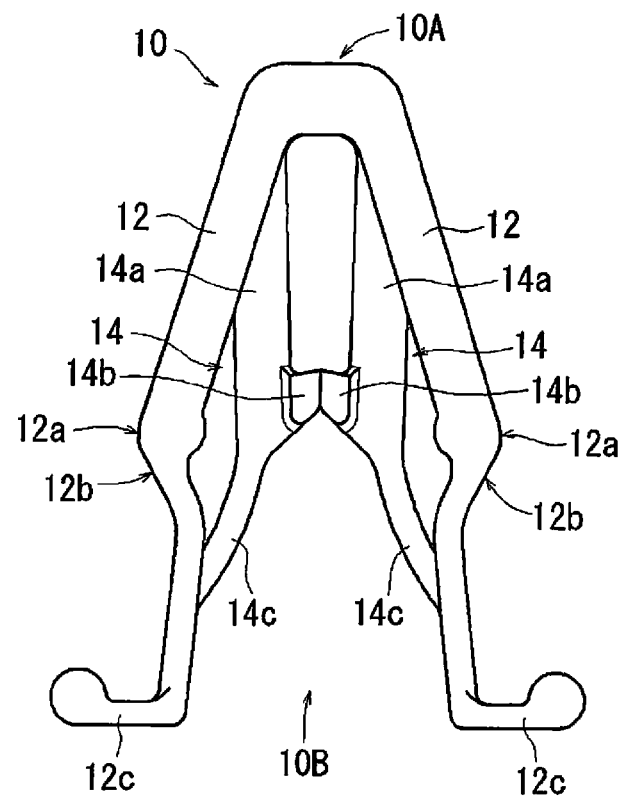
FIG. 4 is a front view of the clip.

The clip main body 10 is an integrated molded product made of a resin. As shown in FIG. 4, the clip main body 10 has a closed tip end portion 10A and an open base end portion 10B. The clip main body 10 is provided with a pair of engagement arms 12 which are positioned on the right and left outer sides, and a pair of holding members 14 which are positioned on the inner sides of the engagement arms 12. Both of the engagement arms 12 function in holding the corresponding panel 24 through engagement of the clip main body 10 and the corresponding panel 24. Both of the holding members 14 function in holding the clip seat 22 by attaching of the clip main body 10 to the clip seat 22.

As shown in FIG. 4, both of the engagement arms 12 extend from the right and left end portions of the tip end portion 10A of the clip main body 10 toward the base end portion 10B as seen from a front view. Both of the engagement arms 12 are inclined and separate outwardly towards projecting portions 12a. Both of the engagement arms 12 approach each other after the projecting portions 12a and form inclined engagement faces 12b. Both of the engagement arms 12 extend substantially straight from the inclined engagement faces 12b to the base end portion 10B. Terminal portions 12c of both of the engagement arms 12 are curved outwardly at the base end portion 10B and extend outwardly.

Figure 7:
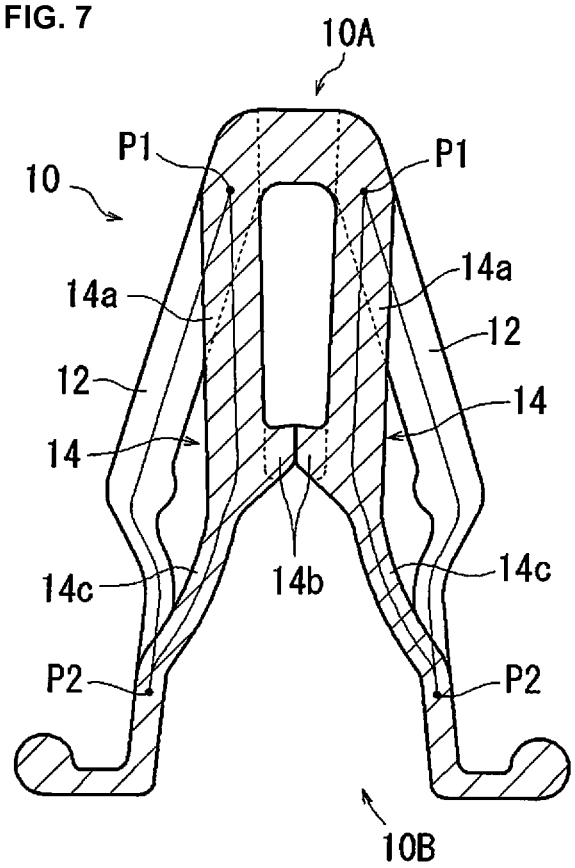
FIG. 7 is a cross-sectional view taken along line VII-VII in FIG. 5.

As shown in FIG. 7, both of the engagement arms 12 can be elastically deformed respectively to the inner side having virtual points P1 as supporting points at the tip end portion 1 OA of the clip main body 1. The virtual points P1 are also supporting points when the holding members 14 are pressed so as to bend.

As shown in FIGS. 4 and 7, the holding members 14 have clamping portions 14a and extending portions 14c. The clamping portions 14a are coupled to the tip end portions 10A of the clip main body 10. The extending portions 14c extend from the lower ends of the clamping portions 14a and are coupled to the base end portion 10B. Both end portions of each of the holding members 14 are coupled to the engagement arms 12. The engagement arms 12 and the holding members 14 are connected to each other forming substantially a square-loop shape such as a rhombic-shape, or the like, as seen from a front view. The engagement arms 12 and the holding members 14 are coupled to each other at the virtual points P1 and P2. The distance between the virtual points P1 and P2 of the engagement arms 12 is substantially equal to the distance between the virtual points P1 and P2 of the holding members 14.

As shown in FIG. 7, the thickness of the clamping portions 14a are thicker than those of the extending portions 14c. The clamping portions 14a have rigidity necessary for holding the attachment member 20 in the state in which clip main body 10 is attached to the clip seat 22 of the attachment member 20. Both of the clamping portions 14a have inner faces opposing each other. Both of the inner faces are inclined, and the gap between both of the inner faces becomes narrower toward the base end portion 10B from the tip end portion 10A.

Figure 5:
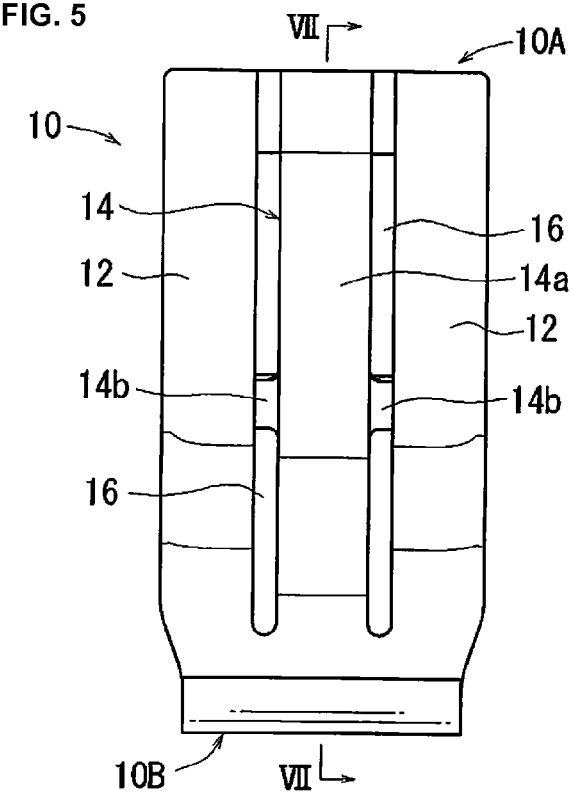
FIG. 5 is a side view of the clip.
Figure 6:
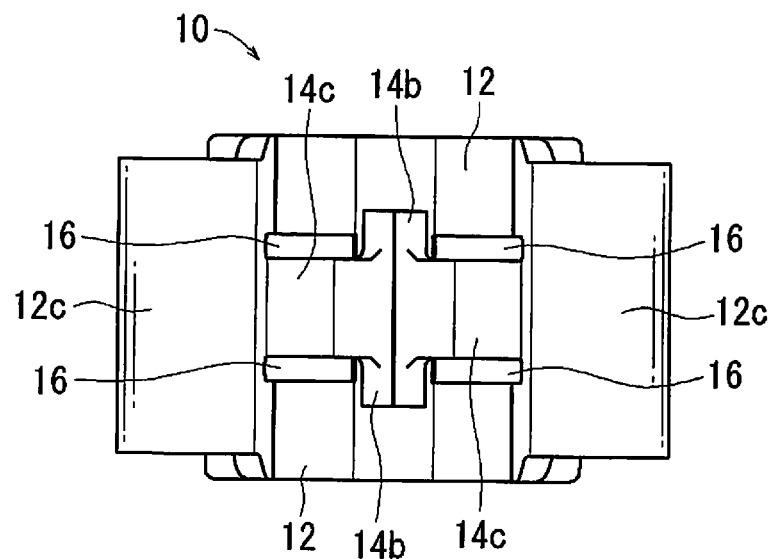
FIG. 6 is a bottom view of the clip.

As shown in FIGS. 4 and 5, both of the holding members 14 have latching lugs 14b at the lower part of the clamping portions 14a. The latching lugs 14b have a wider width than the clamping portions 14a, and project from the clamping portions 14a toward both sides.

As shown in FIG. 5, slits 16 are formed in the clip main body 10. The slits 16 divide the engagement arms 12 and the holding members 14. The holding members 14 are positioned in the center portion of the clip main body 10, and the engagement arms 12 are positioned on both sides thereof. The engagement arms 12 and the holding members 14 are positioned at different locations as seen from a side view. Thus, as seen from a front view, the engagement arms 12 and the holding members 14 may overlap each other when they are inwardly elastically deformed having the virtual point P1 shown in FIG. 7 as a supporting point.

The attachment member 20 is made of a resin, and is an interior part of an automobile such as a center cluster, or the like. As shown in FIG. 1, the attachment member 20 has the clip seat 22 integrally formed on a back side of a designed surface. The clip seat 22 has a thickness whereby it can be inserted into a space between the opposing inner faces of the clamping portions 14a of the holding members 14. A coupling hole 22a penetrates the clip seat 22 in the thickness direction. Reinforcing ribs 22b are provided on both sides of the clip seat 22.

As shown in FIG. 1, the corresponding panel 24 is a plate member such as an instrument panel, or the like. The fixing hole 26 penetrates the corresponding panel 24 in the thickness direction thereof.

Figure 8:
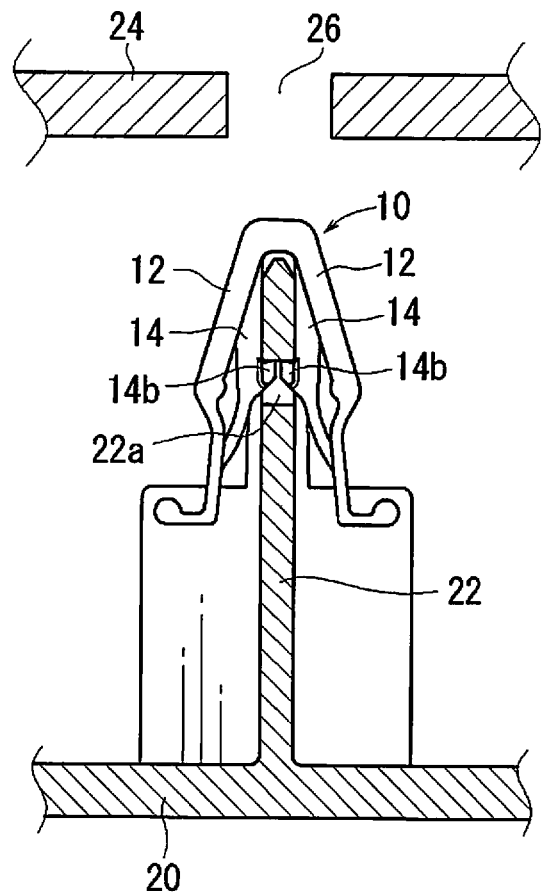
FIG. 8 is a cross-sectional view of the corresponding panel and the clip before the clip is inserted into a fixing hole of the corresponding panel.

Hereinafter, one example of a procedure in which the attachment member 20 may be fixed to the corresponding panel 24 using the clip main body 10 will be described. First, the clip seat 22 of the attachment member 20 is relatively inserted into the space between both of the holding members 14 from the side of the open base end portion 10B of the clip main body 10. The clip seat 22 advances to the space between the opposing inner faces of the clamping portions 14a of both of the holding members 14. As shown in FIG. 8, the latching lugs 14b of both of the holding members 14 are engaged with the coupling hole 22a of the clip seat 22 on both sides. Accordingly, the clip main body 10 is attached to the clip seat 22 of the attachment member 20.

The opposing inner faces of the clamping portions 14a have a tapered shape. Thus, even though the thicknesses of the clip seats 22 are not the same, the clip main body 10 can prevent shakiness thereof in the clip seat 22. The latching lugs 14b of the holding members 14 project on both sides of the clamping portions 14a. Thus, even when the width of the holding members 14 is relatively narrow as seen from a side view, the latching lugs 14b can be caught in the coupling hole 22a of the clip seat 22 in a sufficiently large area.

Figure 9:
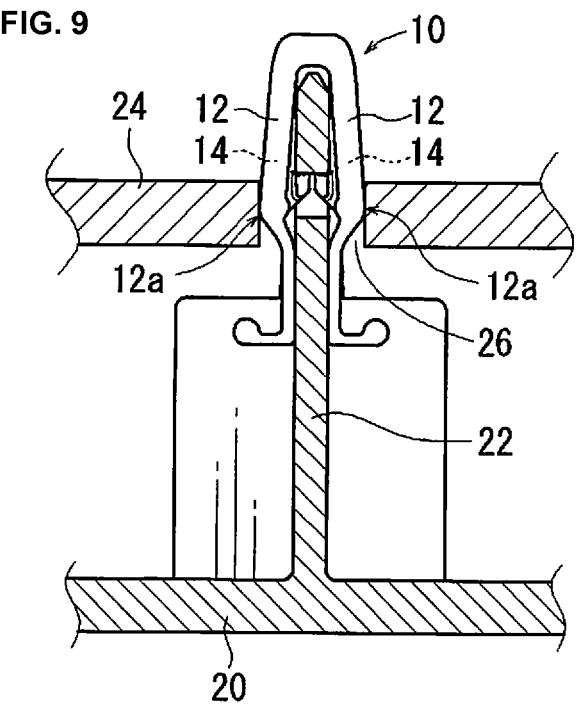
FIG. 9 is a cross-sectional view of the corresponding panel and the clip when the clip is inserted into the fixing hole.

The clip main body 10 attached to the clip seat 22 is moved from the position shown in FIG. 8 to the position shown in FIG. 9 so as to be inserted into the fixing hole 26 of the corresponding panel 24. Both of the engagement arms 12 of the clip main body 10 are pressed by the edge of the fixing hole 26 so as to bend inwardly. Both of the engagement arms 12 are elastically deformed having the virtual point P1 shown in FIG. 7 as a supporting point. As shown in FIG. 9, both of the engagement arms 12 bend to the maximum extent when the projecting portions 12a penetrate through the fixing hole 26.

As shown in FIG. 9, when both of the engagement arms 12 are elastically deformed, the engagement arms 12 and the holding members 14 overlap each other as seen from a side view. The width of the clip main body 10 is reduced in the right-left direction when the clip main body 10 penetrates through the fixing hole 26. Thus, the opening dimension of the fixing hole 26 in the right-left direction can be reduced. The engagement arms 12 and the holding members 14 are divided by the slits 16. Thus, both of the engagement arms 12 can bend without considerable force being applied thereon so as to penetrate through the fixing hole 26. Accordingly, an insertion load on the clip main body 10 can be lowered.

Figure 10:
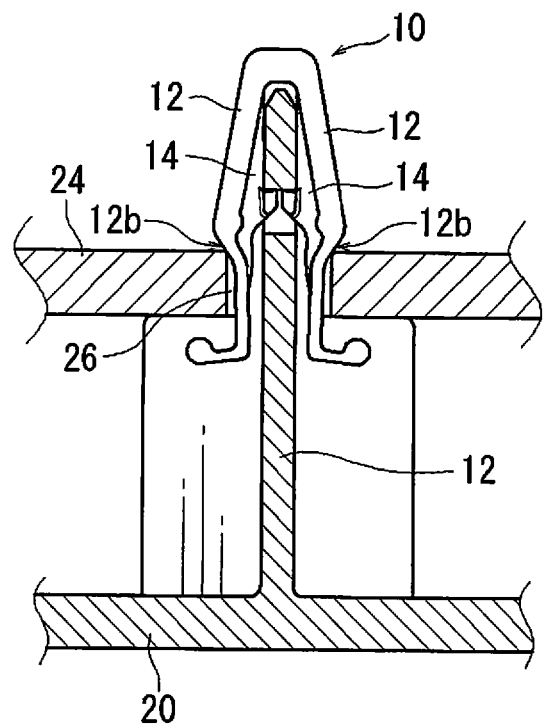
FIG. 10 is a cross-sectional view of the corresponding panel and the clip when the clip is attached to the corresponding panel.
Figure 11:
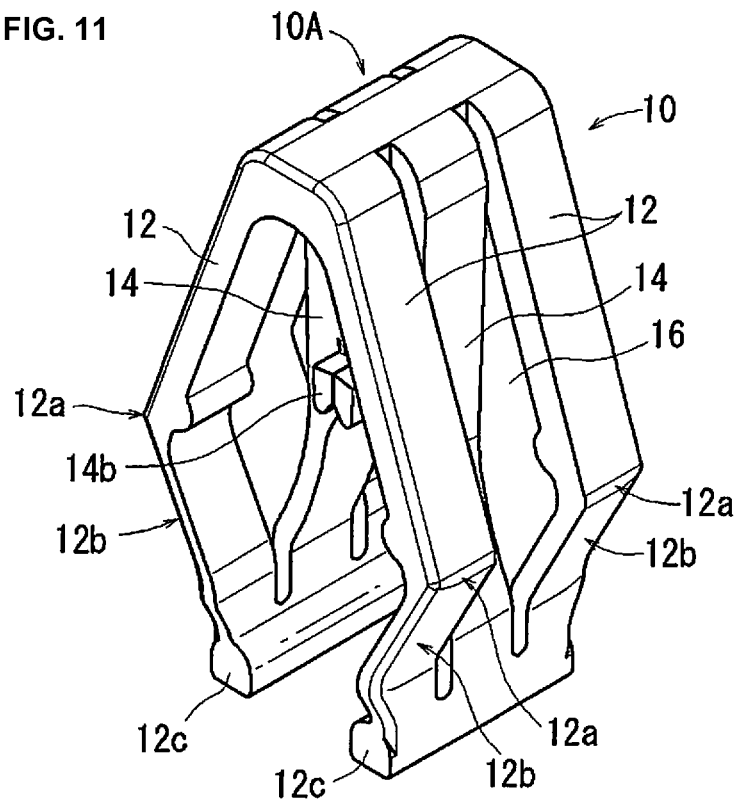
FIG. 11 is a perspective view of another configuration of the clip from above.
Figure 12:
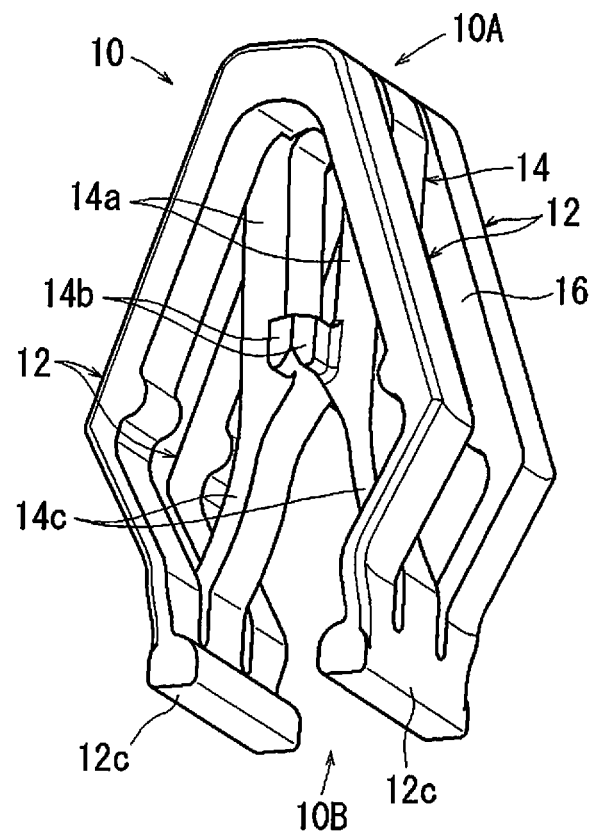
FIG. 12 is a perspective view of the clip in FIG. 11 from below.
Figure 13:
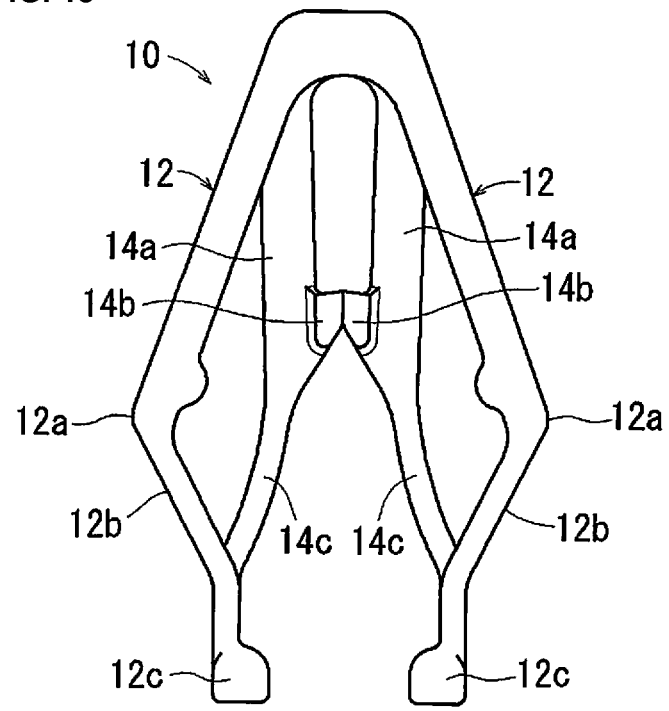
FIG. 13 is a front view of the clip in FIG. 11.
Figure 14:
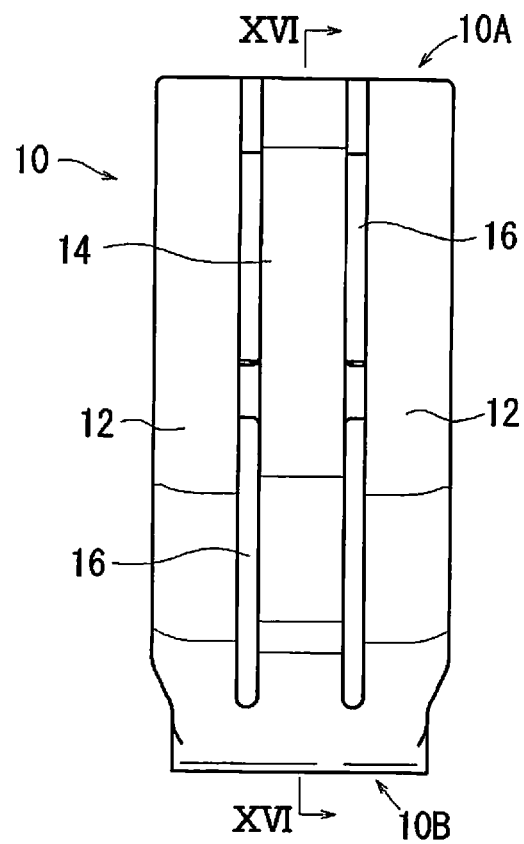
FIG. 14 is a side view of the clip in FIG. 11.
Figure 15:
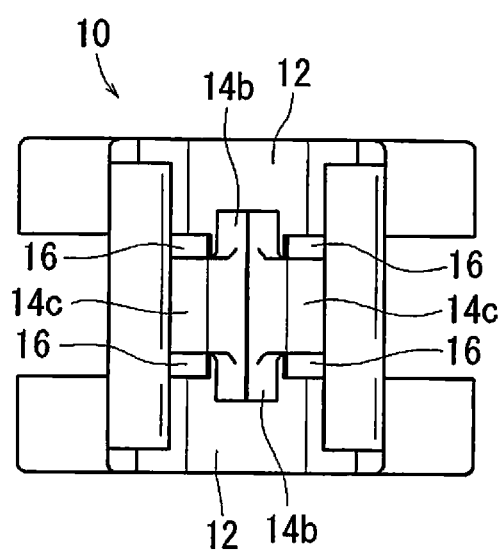
FIG. 15 is a bottom view of the clip in FIG. 11.

As shown in FIGS. 10 and 11, after the projecting portions 12a of both of the engagement arms 12 penetrate through the fixing hole 26, the insertion of the clip main body 10 is completed. Accordingly, the inclined engagement faces 12b of both of the engagement arms 12 are engaged with the end of the fixing hole 26. In this manner, the attachment member 20 is fixed to the corresponding panel 24 using the clip man body.

As shown in FIG. 4, each engagement arm 12 is substantially connected to each holding member 14 in a square-loop shape such as a rhombic shape. Thus, the engagement arms 12 and the holding members 14 easily generate the required elastic force. Accordingly, the clip main body 10 may be held securely to the corresponding panel 24 in the state as shown in FIG. 10.

When the attachment member 20 is taken out from the corresponding panel 24, a load is exerted on the direction in which the clip main body 10 is pulled. As shown in FIGS. 9 and 10, both of the engagement arms 12 receive force from the edge of the fixing hole 26 so as to bend inwardly. The force is directly transmitted to the clamping portions 14a through the virtual point P2 and the extending portions 14c of the holding members 14 shown in FIG. 7. Accordingly, the clamping portions 14a bend inwardly having the virtual point P1 as a supporting point, and engagement force of the clamping portions 14a with the clip seat 22 increases. As a result, the clip main body 10 can be pulled out from the fixing hole 26 in the state in which the clip main body is attached securely to the clip seat 22.

As described above, as shown in FIGS. 1 and 2, the clip main body 10 is made of resin and has a shape having one closed end portion 10A and an open end portion 10B as viewed from the front. The clip main body 10 has engagement arms 12 and holding members 14 positioned on the inner side of the engagement arms 12. The engagement arms 12 are configured to be pressed so as to be elastically deformed when the clip main body 10 penetrates through the fixing hole 26 of the corresponding panel 24. The engagement arms 12 are configured to engage with the edge of the fixing hole 26 when the engagement arms 12 are inserted into the fixing hole 26. The holding members 14 are configured to hold the state in which the clip main body 10 is attached to the clip seat 22 of the attachment member 20. The engagement arms 12 and the holding members 14 are configured to be connected to each other substantially in a rhombic-loop shape as seen from a front view, to be positioned differently from a side view, and to overlap each other as seen from a front view during elastic deformation.

Thus, when the clip main body 10 penetrates through the fixing hole 26 of the corresponding panel 24, the engagement arms 12 and the holding members 14 overlap each other as seen from the front view. Accordingly, the width of the clip main body 10 as seen from the front view is reduced. Thus, the opening dimension of the fixing hole 26 can be further reduced without thinning the engagement arms 12 or the holding members 14. The engagement arms 12 bend while overlapping with the holding members 14 as seen from the front view. Thus, the engagement arms 12 are elastically deformed while being hardly affected by the holding members 14 when the clip main body 10 is inserted into the fixing hole 26. Accordingly, the insertion load is relatively lowered.

Due to the fact that the engagement arms 12 and the holding members 14 may be connected to each other substantially in a rhombic-loop shape, elastic force necessary for the engagement arms 12 can be secured. Thus, the force generated when the engagement arms 12 are elastically deformed is directly transmitted to the holding members 14. In this way, the holding members 14 can strongly engage with the clip seat 22. Accordingly, when the attachment member 20 is taken out from the corresponding panel 24, the clip main body 10 can be pulled out from the fixing hole 26 of the corresponding panel 24 in the state in which the clip main body is securely attached to the clip seat 22.

As shown in FIG. 7, the engagement arms 12 and the holding members 14 are connected to each other in locations near the one closed end portion 10A and locations near the open end portion 10B of the clip main body 10. Thus, the distance between both supporting points (P1 and P2) of the engagement arms 12 increases during deformation of the engagement arms 12. Accordingly, even when the clip main body 10 is short, a load generated when the clip main body 10 is inserted into the fixing hole 26 can be lowered.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

Figure 2:
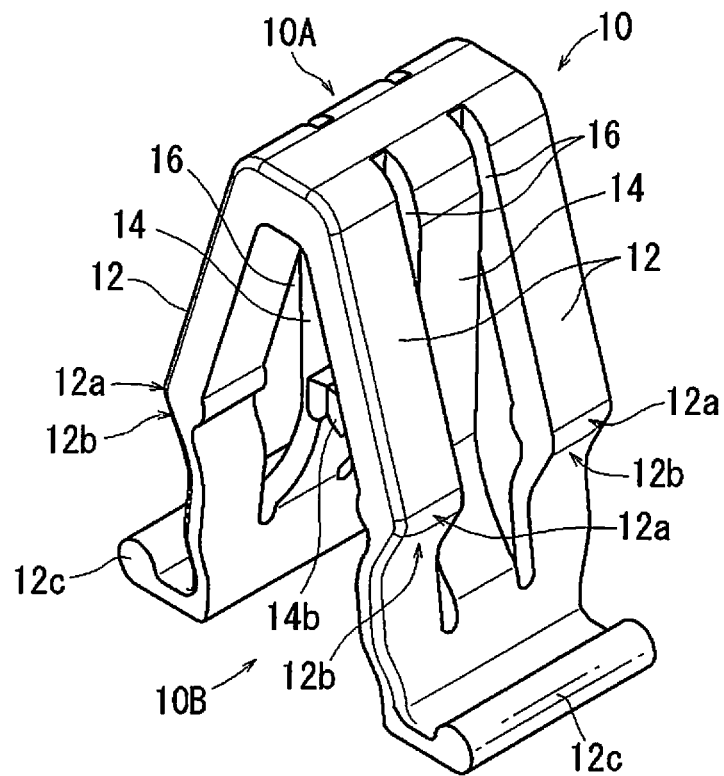
FIG. 2 is a perspective view of the clip from obliquely above.
Figure 3:
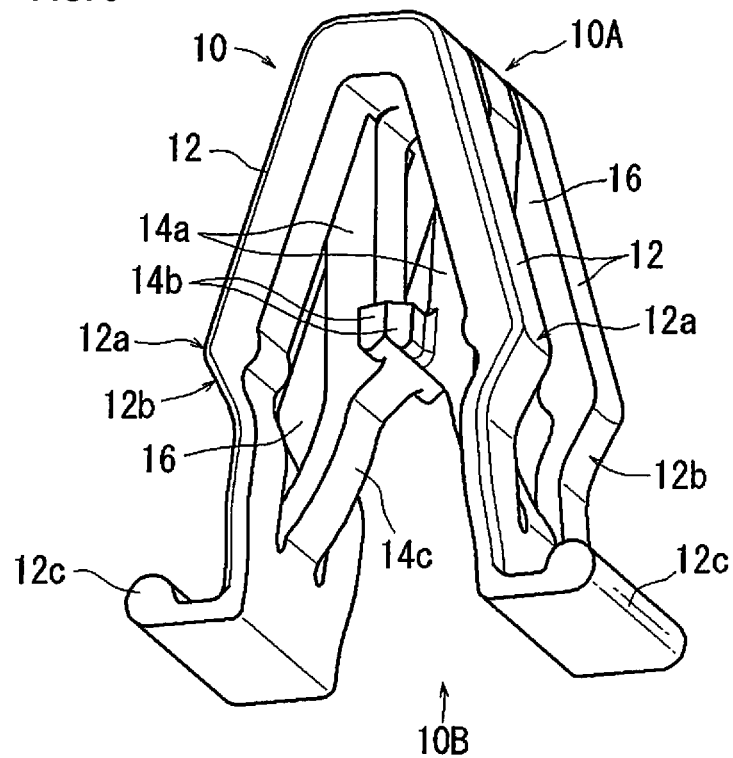
FIG. 3 is a perspective view of the clip from obliquely below.

The clip main body 10 may have the structure shown in FIGS. 11 to 16 instead of the structure shown in FIGS. 2 and the like. The clip main body 10 shown in FIGS. 11 to 16 has the engagement arms 12 and the holding members 14 connected to each other substantially in a square-loop shape such as a rhombic-shape, or the like. The engagement arms 12 and the holding members 14 can be positioned differently from a side view, and overlap each other as seen from a front view.

Figure 16:
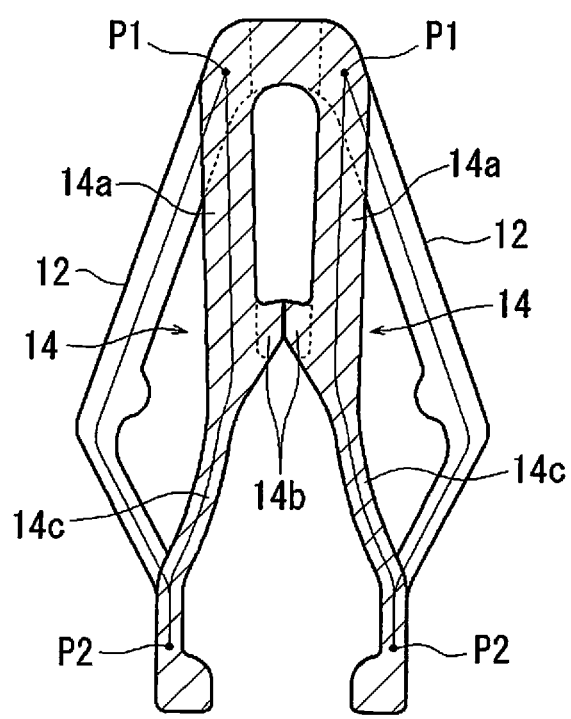
FIG. 16 is a cross-sectional view taken along line XVI-XVI in FIG. 14.

The engagement arms 12 shown in FIGS. 11 to 16 have substantially straight terminal portions 12c. As shown in FIG. 16, the engagement arms 12 and the holding members 14 are coupled to each other at the virtual points P1 and P2. The distance between the virtual points P1 and P2 of the engagement arms 12 is longer than the distance between the virtual points P1 and P2 of the holding members 14.

Instead of the structure shown in FIG. 16, the distance between the virtual points P1 and P2 of the engagement arms 12 may be shorter than the distance between the virtual points P1 and P2 of the holding members 14.

The clip main body may also have a supporting member, one engagement arm 12, and one holding member 14, instead of the structure of FIG. 4. The supporting member is positioned at the center thereof in the right-left direction in a front view having a plate shape. The engagement arm 12 and the holding member 14 can be formed only on one side of the supporting member. Even in this structure, the same function as that of the clip main body described above can be exhibited.

Rather than having the structure of FIG. 5, the clip main body 10, may also have a structure in which the positions of the engagement arms 12 and the holding members 14 are formed opposite each other. That is, the engagement arms 12 may be positioned at the center and the holding members 14 may be positioned on body sides thereof.

Instead of the structure shown in FIG. 5, the clip main body 10 may have each one engagement arm 12 and holding member 14, and only one slit 16 may be formed on each side face of the clip main body 10.

Instead of the structure of FIG. 5, each side face of the clip main body 10 may have two engagement arms 12 and two holding members 14, and three slits 16 may be formed on each side face of the clip main body 10. In this structure, the arrangement of the engagement arms 12 and the holding members 14 may be arbitrary. For example, the two engagement arms 12 may be positioned on the inner side or the outer side, the two holding members 14 may be positioned on the inner side or the outer side, and the engagement arms 12 and the holding members 14 may be alternately positioned.

The various clip main bodies 10 described above can be appropriately selected according to the location of use, and the like.

The invention claimed is:

1. A clip for attaching an attachment member to a corresponding panel by inserting it into a fixing hole of the corresponding panel in a state where the clip is attached to a clip seat of the attachment member, the clip comprising:
   a clip main body made of a resin, the clip main body having a front view shape having a closed end portion and an open end portion;
   wherein the clip main body comprises an engagement arm and a holding member positioned on an inner side of the engagement arm;
   wherein the engagement arm is configured to be pressed when the clip main body penetrates through the fixing hole of the corresponding panel so as to be elastically deformed, and the engagement arm is configured to engage with an edge of the fixing hole when the engagement arm is inserted into the fixing hole;
   wherein the holding member is configured to hold a state in which the clip main body is attached to the clip seat of the attachment member; and
   wherein the engagement arm and the holding member are connected to each other substantially in a rhombic-loop shape from a front view, and the engagement arm and the holding member are disposed in different positions from a side view, and are configured to overlap each other as seen from the front view during an elastic deformation thereof;
   wherein a slit is formed between the engagement arm and the holding member, and the slit extends to a top edge of the closed end portion of the clip main body to extend through the closed end portion; and
   wherein the engagement arm and the holding member are configured to be elastically deformed so that when the clip is inserted into the fixing hole, the open end portion of the clip main body moves in a closed direction.

2. A clip for attaching an attachment member to a corresponding panel by inserting it into a fixing hole of the corresponding panel in a state where the clip is attached to a clip seat of the attachment member, the clip comprising:
   a clip main body made of a resin, the clip main body having a front view shape having a closed end portion and an open end portion;
   wherein the clip main body comprises an engagement arm and a holding member positioned on an inner side of the engagement arm;
   wherein the engagement arm is configured to be pressed when the clip main body penetrates through the fixing hole of the corresponding panel so as to be elastically deformed, and the engagement arm is configured to engage with an edge of the fixing hole when the engagement arm is inserted into the fixing hole;
   wherein the holding member is configured to hold a state in which the clip main body is attached to the clip seat of the attachment member;
   wherein the engagement arm and the holding member are connected to each other substantially in a rhombic-loop shape from a front view so that the engagement arm and the holding member respectively are connected at ends thereof in a location near the closed end portion and a location near the open end portion of the clip main body;
   wherein the engagement arm and the holding member independently extend from an edge of the closed end portion of the clip main body;
   wherein the engagement arm and the holding member are disposed in different positions from a side view in a state that the engagement arm and the holding member are independent, and the engagement arm and the holding member are configured to overlap each other as seen from the front view during an elastic deformation thereof when the engagement arm is elastically deformed;
   wherein a slit is formed between the engagement arm and the holding member, and the slit extends to a top edge of the closed end portion of the clip main body to extend through the closed end portion; and
   wherein the engagement arm and the holding member are configured to be elastically deformed so that when the clip is inserted into the fixing hole, the open end portion of the clip main body moves in a closed direction.

* * * * *